United States Patent
Ikeda (10) Patent No.: US 12,236,987 B2
(45) Date of Patent: Feb. 25, 2025

(54) MAGNETIC RECORDING MEDIA WITH METAL-DOPED CAPPING LAYER

(71) Applicant: Western Digital Technologies, Inc., San Jose, CA (US)

(72) Inventor: Yoshihiro Ikeda, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/472,415

(22) Filed: Sep. 10, 2021

(65) Prior Publication Data

US 2023/0078748 A1 Mar. 16, 2023

(51) Int. Cl.
| | |
|---|---|
| *G11B 5/66* | (2006.01) |
| *G11B 5/65* | (2006.01) |
| *G11B 5/73* | (2006.01) |
| *G11B 5/84* | (2006.01) |

(52) U.S. Cl.
CPC .............. *G11B 5/66* (2013.01); *G11B 5/656* (2013.01); *G11B 5/7379* (2019.05); *G11B 5/8408* (2013.01)

(58) Field of Classification Search
CPC ....................................................... G11B 5/66
See application file for complete search history.

(56) References Cited

U.S. PATENT DOCUMENTS

| | | |
|---|---|---|
| 6,680,106 B1 | 1/2004 | Thangaraj et al. |
| 9,034,492 B1 | 5/2015 | Mallary et al. |
| 2002/0127433 A1* | 9/2002 | Shimizu ................ G11B 5/667 428/832 |
| 2004/0023074 A1* | 2/2004 | Shimizu ............... G11B 5/7371 428/827 |
| 2007/0087227 A1 | 4/2007 | Ma et al. |
| 2009/0080110 A1 | 3/2009 | Berger et al. |
| 2009/0155627 A1 | 6/2009 | Berger et al. |
| 2010/0092802 A1 | 4/2010 | Ma et al. |
| 2010/0124672 A1 | 5/2010 | Thangaraj et al. |
| 2010/0209741 A1* | 8/2010 | Sasaki ...................... G11B 5/65 428/846.8 |
| 2012/0189872 A1* | 7/2012 | Umezawa ............... C23C 16/26 428/800 |
| 2014/0168817 A1 | 6/2014 | Choe et al. |

(Continued)

OTHER PUBLICATIONS

Watson, Matt, "Overview of the Pt and Ru Demand during Recent HDD Technology Transitions," Precious Metals Commodity Management LLC; Aug. 10, 2019; https://www.preciousmetalscommoditymanagement.com/blog/overview-of-the-pt-and-ru-demand-during-recent-hdd-technology-transitions; 18 pages.

*Primary Examiner* — Holly Rickman
*Assistant Examiner* — Linda N Chau
(74) *Attorney, Agent, or Firm* — LOZA & LOZA, LLP; Gabriel Fitch (57) ABSTRACT

Various apparatuses, systems, methods, and media are disclosed to provide a magnetic recording medium that capping layer doped with an effective amount of metal to control grain-to-grain exchange coupling in a capping layer. A magnetic recording medium includes a substrate, a magnetic recording layer (MRL) on the substrate, and a capping layer on the MRL. The capping layer include Co and is doped with a metal (e.g., Ru or Ta) in a range from 1 atomic percent to 5 atomic percent, inclusive.

11 Claims, 6 Drawing Sheets

(56) References Cited

U.S. PATENT DOCUMENTS

2015/0036243 A1\* 2/2015 Inoue ...................... C23C 14/08
 204/192.1
2015/0302877 A1\* 10/2015 Tang .................... G11B 5/8408
 216/22
2017/0221515 A1\* 8/2017 Inoue ...................... G11B 5/66

\* cited by examiner

MAGNETIC RECORDING MEDIA WITH METAL-DOPED CAPPING LAYER

FIELD

The disclosure relates, in some aspects, to magnetic recording media for use with magnetic recording devices, and more particularly, to magnetic recording media with a metal-doped capping layer for controlling grain-to-grain exchange coupling in the capping layer.

INTRODUCTION

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disks. Perpendicular magnetic recording (PMR) has been used to increase the areal recording density of magnetic storage media. One way to increase the storage capacity of magnetic storage media (e.g., PMR media) is to further improve the areal density.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one embodiment, a magnetic recording medium includes a substrate, a magnetic recording layer (MRL) on the substrate, and a capping layer on the MRL. The capping layer includes Co, and is doped with Ru in a range from 1 atomic percent to 5 atomic percent, inclusive. In one example, a surface roughness of the capping layer is less than 4 Angstrom (Å). In one example, the surface roughness of the capping layer is less than 3.5 Å. In one example, a thickness of the capping layer is in a range from 5 Å to 20 Å, inclusive.

In one embodiment, a data storage device includes a slider including a magnetic head and the magnetic recording medium described herein, wherein the slider is configured to write information to the magnetic recording layer of the magnetic recording medium.

In one embodiment, a method for manufacturing a magnetic recording medium is provided. The method includes providing a substrate and providing a magnetic recording layer (MRL) on the substrate. The method further includes providing a capping layer on the MRL, the capping layer including Co. The capping layer is doped with Ru in a range from 1 atomic percent to 5 atomic percent, inclusive. In one example, the method further includes reducing a roughness of the capping layer such that surface roughness of the capping layer is less 4 Angstrom (Å). In one example, the method further includes etching the capping layer using a non-reactive gas to reduce the roughness of the capping layer.

In one embodiment, a magnetic recording medium includes a substrate, a magnetic recording layer (MRL) on the substrate, and a capping layer on the MRL. The capping layer includes Co and is doped with Ta in a range from 1 atomic percent to 5 atomic percent, inclusive.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In a similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to various apparatuses, systems, methods, and media for magnetic recording and data storage. In some aspects, areal density in magnetic recording media can be improved using a capping layer that has a high magnetic moment and low magnetic exchange coupling between grains. In one aspect, a metal-doped capping layer can have a high percentage of Co to achieve a high magnetic moment without suffering from a high grain-to-grain exchange coupling. Therefore, magnetic recording media using the disclosed metal-doped capping layer can achieve higher areal density. Some exemplary magnetic recording media include perpendicular magnetic recording (PMR) media, heat-assisted magnetic recording (HAMR) media, microwave-assisted magnetic recording (MAMR) media, and shingled magnetic recording (SMR) media.

In some designs, a capping layer may consist of various materials, for example, Co, Cr, Pt, and B. Increasing the percentage of Co in the capping layer may increase the magnetic moment of the magnetic recording media. However, simply increasing the Co percentage in the capping layer may not result in higher areal density because higher Co percentage in the capping layer can increase grain-to-grain magnetic exchange coupling that leads to wider trackwidth and lower areal density. In some aspects, this disclosure relates to a capping layer for magnetic recording media doped with a small amount of metal to control grain-to-grain exchange coupling of the capping layer. In some aspects, the capping layer can be etched to obtain a smoother air bearing surface such that a thinner protective layer can be deposited on the capping layer (e.g., to reduce head to media spacing and possibly increase recording density just for this reason).

Figure 1:
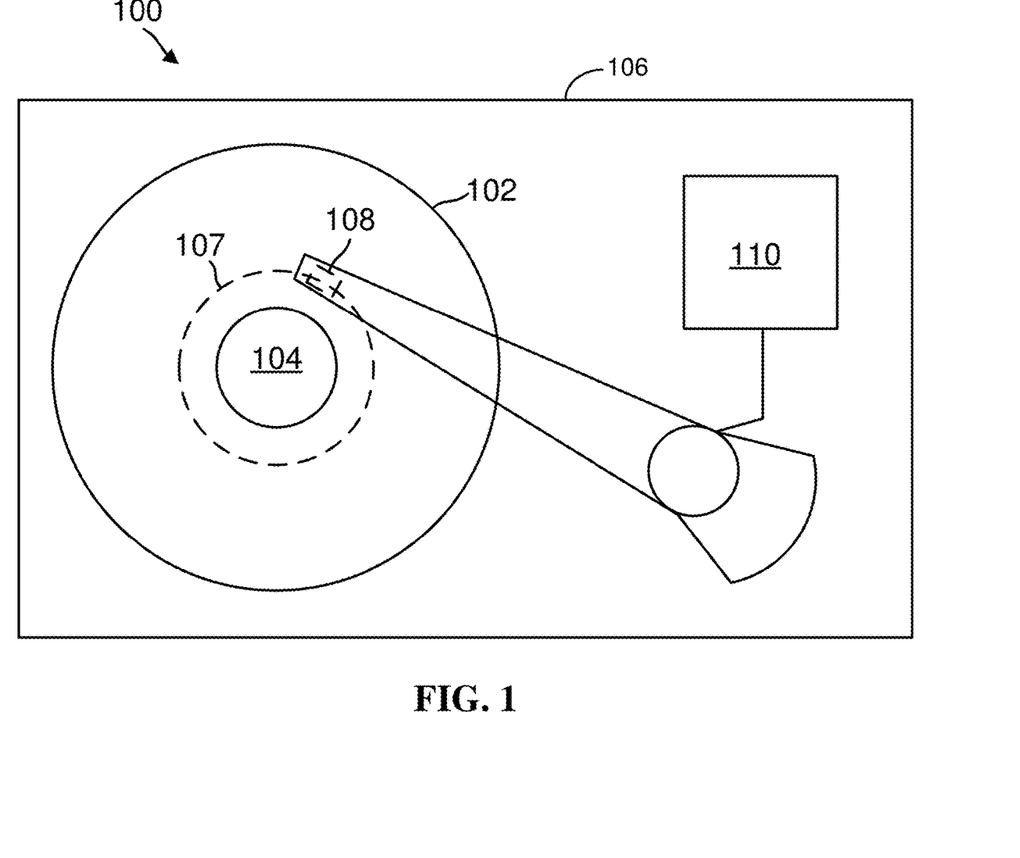
FIG. 1 is a top schematic view of a disk drive configured for magnetic recording including a slider and a magnetic recording medium with a metal-doped capping layer in accordance with one aspect of the disclosure.

FIG. 1 is a top schematic view of a data storage device 100 (e.g., disk drive or magnetic recording device) configured for magnetic recording comprising a slider 108 and a magnetic recording medium 102 according to one or more aspects of the disclosure. Disk drive 100 may comprise one or more disks/media 102 to store data. Disk/media 102 resides on a spindle assembly 104 that is mounted to a drive housing 106. Data may be stored along tracks in the magnetic recording layer of disk 102. The reading and writing of data is accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). Some embodiments of the data storage device 100 are HAMR, EAMR, or non-EAMR magnetic data recording systems, including perpendicular magnetic recording (PMR) disk drives or magnetic tape drives.

Figure 2:
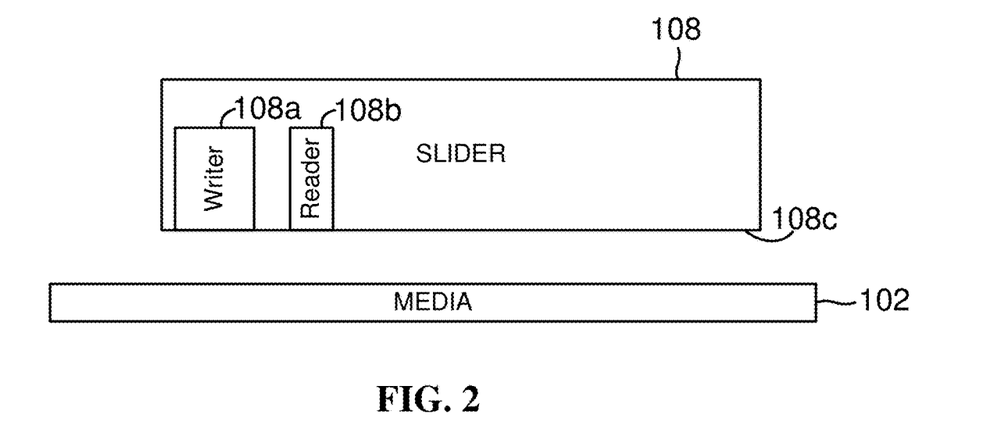
FIG. 2 is a side schematic view of the slider and magnetic recording medium of FIG. 1 in accordance with one aspect of the present.

FIG. 2 is a side schematic view of the slider 108 and magnetic recording medium 102 of FIG. 1. The magnetic recording medium 102 may have a capping layer (e.g., a capping layer shown in FIG. 3) configured to have a high magnetic moment and low grain-to-grain exchange coupling to increase the recording areal density of the medium 102 in accordance with one or more aspects of the disclosure. The slider 108 comprises a write element (e.g., writer) 108a and a read element (e.g., reader) 108b positioned along an air bearing surface (ABS) 108c of the slider for writing information to, and reading information from, respectively, the media 102.

Figure 3:
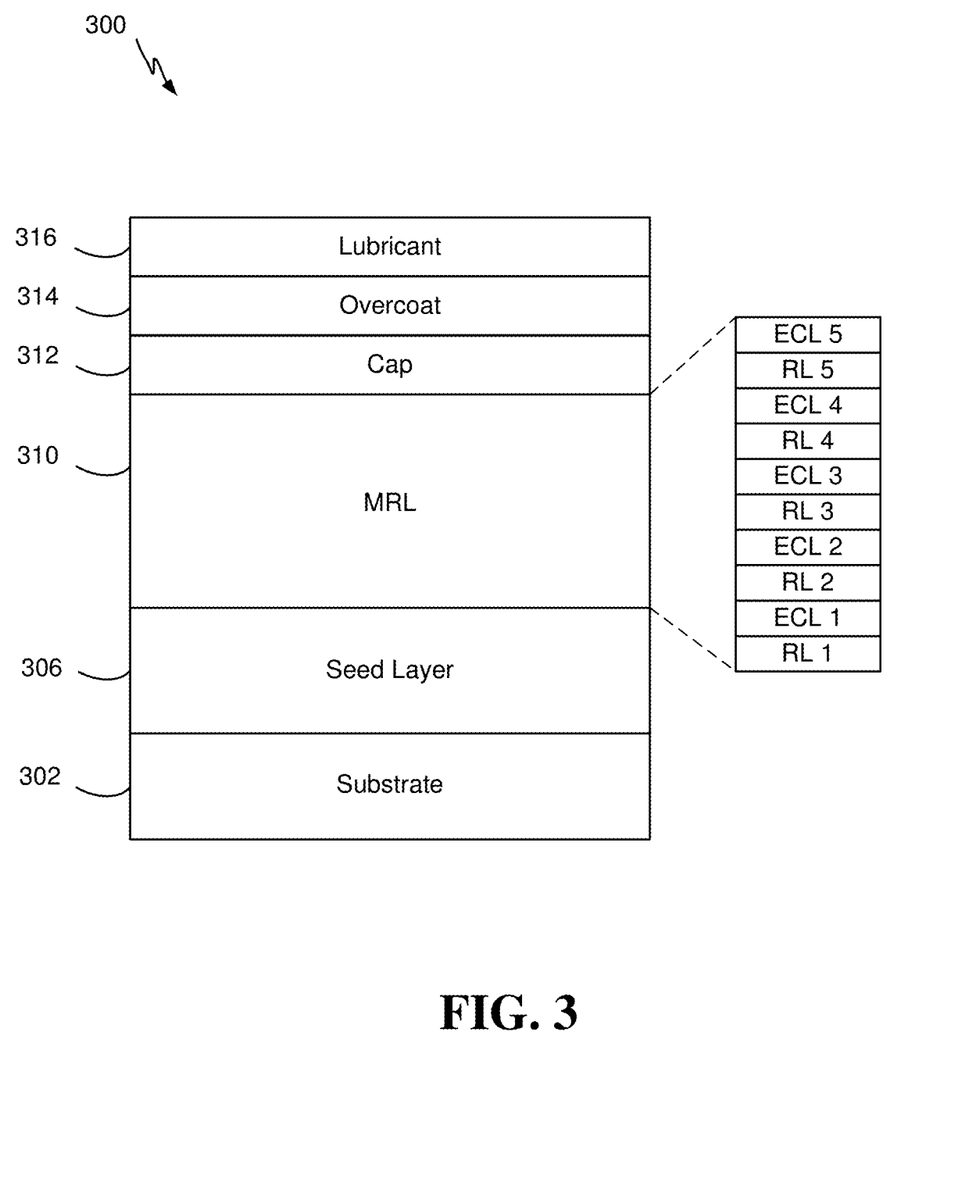
FIG. 3 is a side schematic view of a magnetic recording medium with a metal-doped capping layer in accordance with one aspect of the disclosure.

FIG. 3 is a side schematic view of a magnetic recording medium 300 with a metal-doped capping layer in accordance with one aspect of the disclosure. In some embodiments, the magnetic recording medium 300 may be a PMR or HAMR medium. The magnetic recording medium 300 has a stacked structure with a substrate 302 at a bottom/base layer, a seed layer 306 on the substrate 302, a magnetic recording layer (MRL) 310 on the seed layer 306, a capping layer 312 on the MRL 310, an overcoat layer 314 on the capping layer 312. In some examples, the MRL 310 may include one or more magnetic recording layers. In some embodiments, the medium 300 may have a lubricant layer 316 on the overcoat layer 314.

In some aspects, the substrate 302 may be made of one or more materials such as an Al alloy, NiP plated Al, glass, glass ceramic, and/or combinations thereof. In some aspects, the seed layer 306 may be made of MgO or other suitable materials known in the art. In one embodiment, the seed layer 306 has a certain lattice structure that can determine a lattice structure of a layer (e.g., MRL 310) grown/deposited on the seed layer 306. In some aspects, the MRL 310 may be made of FePt or an alloy selected from FePtX, where X is a material selected from Cu, Ni, and combinations thereof. In some aspects, the MRL 310 may be made of a CoPt alloy. In some aspects, the overcoat layer 314 may be made of carbon. In some aspects, the lubricant layer 316 may be made of a polymer-based lubricant. In some aspects, the MRL 310 may include a plurality of recording layers (e.g., RL 1, RL 2, RL 3, RL 4, RL 5) interleaved with exchange coupling layers (e.g., ECL 1, ECL 2, ECL 3, ECL 4, ECL 5). The recording layers may have the same thickness or different thicknesses. In one example, RL 1 may be 2 nm thick, RL 2 may be 2 nm thick, RL 3 may be 1.4 nm thick, RL 4 may be 1.25 nm thick, and RL 5 may be 1.25 nm thick. The exchange coupling layers may have the same thickness or different thicknesses. In one example, ECL 1 may be 1 nm thick, ECL 2 may be 1 nm thick, ECL 3 may be 0.58 nm thick, ECL 4 may be 0.57 nm thick, and ECL 5 may be 1.45 nm thick. In other embodiments, the MRL 310 may include more or fewer exchange coupling layers and/or recording layers.

In one embodiment, the capping layer 312 can be doped with an effective amount of metal to control grain-to-grain exchange coupling. In another embodiment, the capping layer 312 can be doped with an effective amount of Ru or Ta. Ru or Ta doping may improve the corrosion robustness of the capping layer. In some aspects, the capping layer 312 may include Co, Pt, Cr, B, and combinations thereof. In one example, the capping layer 312 may include an alloy consisting of Co, Pt, Cr, and B in various proportions.

In some examples, the capping layer 312 can include these composition options: 54.5Co-17Pt-9.5Cr-12B-7Ru, 56.5Co-26Pt-6.5Cr-8B-3Ru, 58.5Co-24Pt-6.5Cr-8B-3Ru, 53.5Co-24Pt-9.5Cr-10B-3Ru, 60.5Co-24Pt-5.5Cr-7B-3Ru, 62.5Co-24Pt-4.5Cr-6B-3Ru, 62.5Co-24Pt-6.5Cr-4B-3Ru, 59Co-24Pt-6Cr-10B-1Ru, or variations thereof. In one embodiment, the capping layer 312 may include an alloy containing higher than 60 atomic percent of Co. Increasing the percentage of Co in the capping layer 312 can increase the magnetic moment of the capping layer 312, thus increasing the overall magnetic moment of the medium 300. However, increasing the magnetic moment of the capping layer can also increase the grain-to-grain exchange coupling (e.g., lateral exchange coupling) that could reduce the areal density of the medium.

In some aspects, the capping layer 312 can be further processed in a planarization procedure to smooth out a top surface before the overcoat 314 is formed on the capping layer 312. After planarization, the capping layer 312 may have a thickness between 5 Angstrom (Å) and 20 Å and a surface roughness (Ra) (e.g., Ra analyzed at 1 micrometer (μm)×1 μm scan surface) less than 4 Å. In an exemplary planarization procedure, the capping layer 312 can be etched using a non-reactive gas or noble gas, for example, Ar, Kr, Xe, etc. However, etching the capping layer 312 can increase the lateral grain-to-grain exchange coupling of the capping layer 12 that results in wider track width and reduced areal density of the medium 300. In some embodiments, the capping layer 312 can be doped with an effective amount of metal (e.g., Ru or Ta) to control or prevent the increase of lateral grain-to-grain exchange coupling after etching or planarization. In some embodiments, the capping layer 312 is doped with Ru in a range of about 1 atomic percent to about 5 atomic percent, inclusive. In one example, the capping layer 132 is doped with Ru in a range of about 2 atomic percent to about 4 atomic percent, inclusive. In one example, the capping layer 132 is doped with about 3 atomic percent (e.g., 2.5 atomic percent to 3.5 atomic percent) of Ru. In one example, the capping layer 132 is doped with Ta in a range of about 1 atomic percent to about 3 atomic percent, inclusive. In one example, the capping layer 132 is doped with about 2 atomic percent (e.g., 1.5 atomic percent to 2.5 atomic percent) of Ta.

The terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

Figure 4:
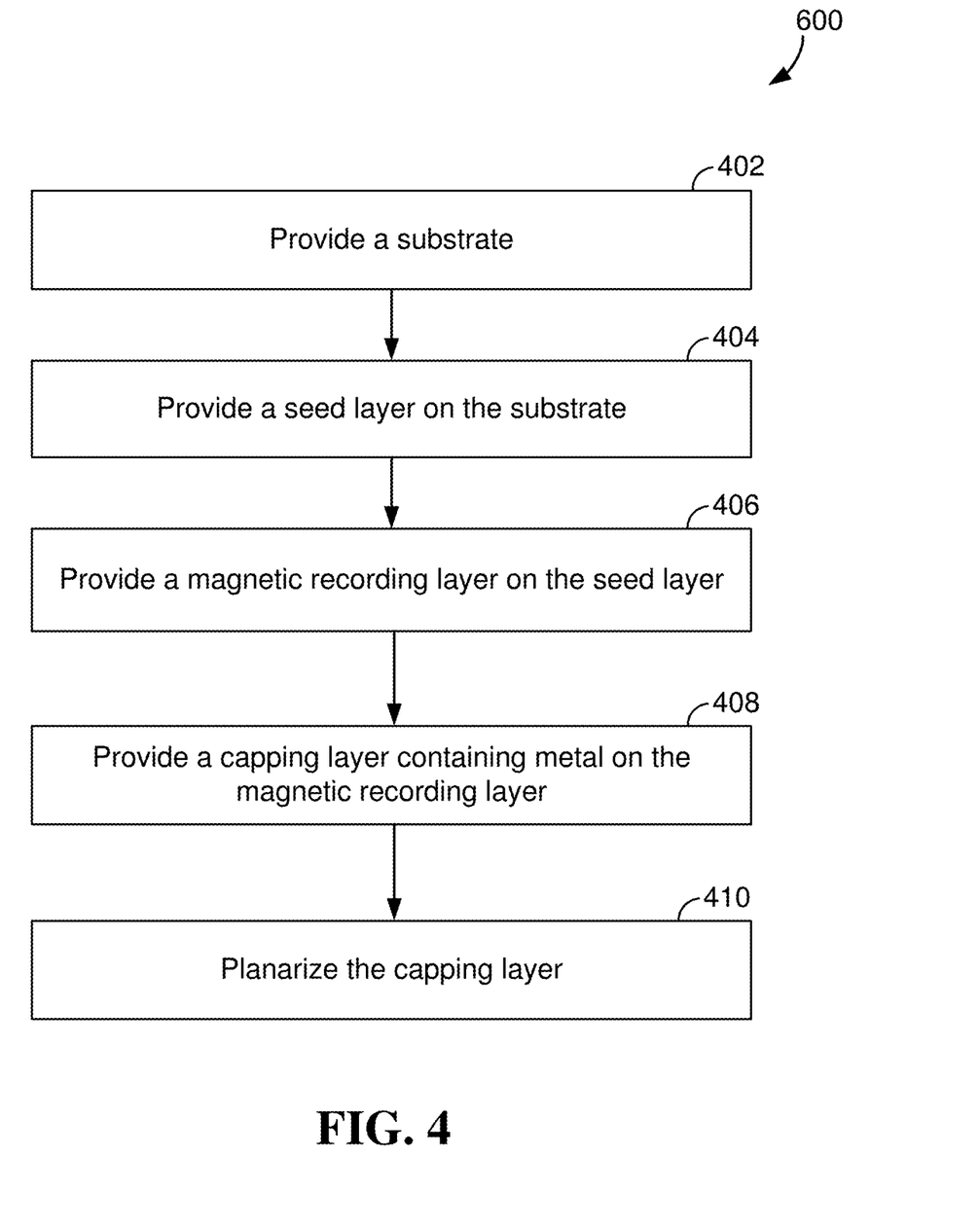
FIG. 4 is a flowchart illustrating a process for fabricating a magnetic recording medium with a metal-doped capping layer in accordance with some aspects of the disclosure.

FIG. 4 is a flowchart of a process 400 for fabricating a medium with a metal-doped capping layer in accordance with some aspects of the disclosure. In one aspect, the process 400 can be used or modified to fabricate the medium described above in relation to FIG. 3. In some aspects, the fabricated medium may be used in the data storage device 100 of FIG. 1.

In block 402, the process provides a substrate (e.g., substrate 302). In some aspects, the substrate can be made of one or more materials such as an Al alloy, NiP plated Al, glass, glass ceramic, and/or combinations thereof. In block 404, the process provides a seed layer (e.g., seed layer 306) on the substrate. In some aspects, the seed layer may be on a heat sink layer already formed on the substrate for HAMR.

In block 406, the process provides a magnetic recording layer (e.g., MRL 310) on the seed layer. In one example, the magnetic recording layer may include one or more magnetic recording layers for storing data magnetically, for example, PMR and HAMR.

In block 408, the process provides a capping layer (e.g., capping layer 312) on the substrate, for example, on the magnetic recording layer. In one example, the capping layer includes an alloy containing Co, Cr, Pt, and B. In one example, the capping layer may contain more than 50 atomic percent of Co (e.g., more than 60 atomic percent Co). Higher percentage of Co can increase the magnetic moment of the capping layer. In one embodiment, the capping layer may be doped with an effective amount of metal (e.g., Ru or Ta) to control lateral grain-to-grain magnetic exchange coupling in the capping layer. In some examples, the capping layer is doped with Ru in a range of about 1 atomic percent to about 5 atomic percent, inclusive. In one example, the capping layer is doped with Ru in a range of about 2 atomic percent to about 4 atomic percent, inclusive. With the doped metal (e.g., Ru or Ta), the capping layer can have a higher magnetic moment without a significant increase in grain-to-grain exchange coupling.

In block 410, the process planarizes the capping layer. Planarization can make the top surface of the capping layer smoother such that a thinner overcoat layer (e.g., overcoat 314) can be used to cover the capping layer. A thinner overcoat layer can improve the magnetic recording performance of the medium because the distance between the slider and the magnetic recording layer can be reduced by using a thinner overcoat layer that is positioned between the slider and the magnetic recording layer. The planarization of the metal-doped capping layer allows the magnetic recording layer (e.g., MRL 310) to be optimized for magnetic performance and not constrained by surface roughness of the medium if planarization is not used. In one example, the planarization process can etch the capping layer using a non-reactive gas or noble gas (e.g., Ar, Kr, Xe). The etching process removes more lighter elements than elements heavier (e.g., Ru, Ta, Pt) than the etching gas (e.g., Kr). Therefore, after etching, increased Pt content in the capping layer can increase the grain-to-grain exchange coupling in the capping layer. However, the capping layer is doped with an effective amount (e.g., between 1 to 5 percent) of metal (e.g., Ru or Ta) to control or reduce the grain-to-grain exchange coupling in the capping layer such that the magnetic moment of the capping layer can be increased without undesirable increase of grain-to-grain exchange coupling. In one example, the planarization process (e.g., etching) reduces the surface Ra of the capping layer to about 4 Å or less, in one particular example, the Ra of the capping layer is about 3.5 Å or less. Higher smoothness of the capping layer enables the use of a thinner overcoat on the capping layer. In one example, a thickness of the capping layer is between about 5 Å and about 20 Å.

In one aspect, the process can perform the sequence of actions in a different order. In another aspect, the process can skip one or more of the actions. In other aspects, one or more of the actions are performed simultaneously. In some aspects, additional actions can be performed.

In several aspects, the deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other aspects, other suitable deposition techniques known in the art may also be used.

Figure 5:
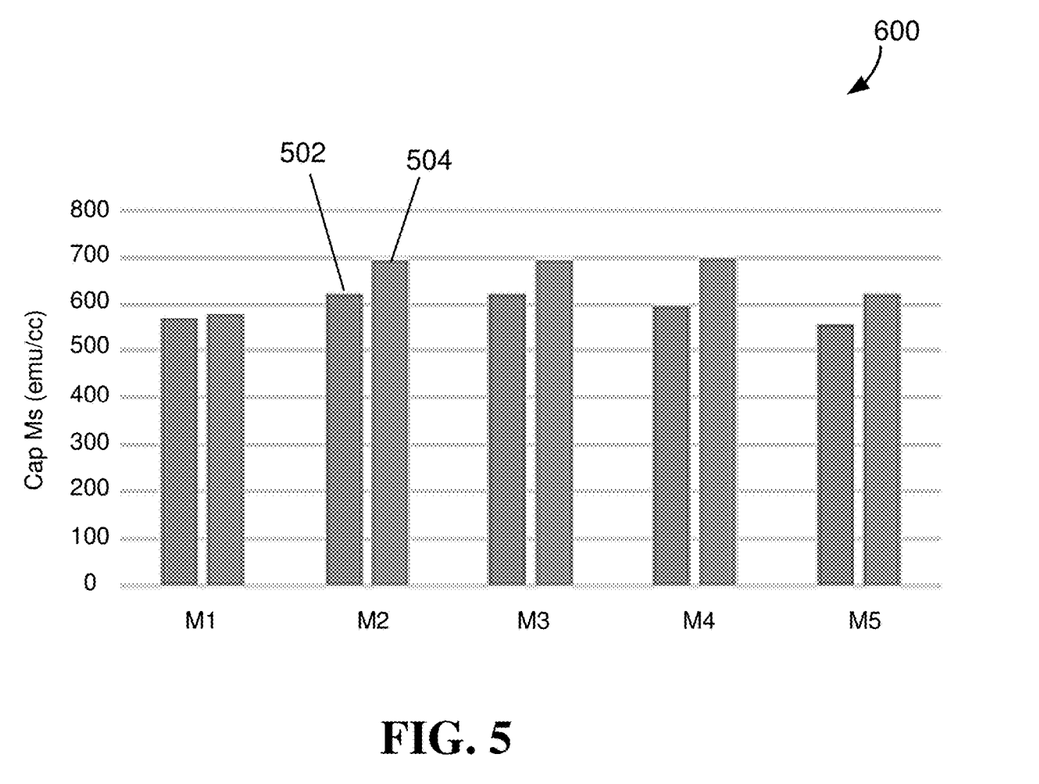
FIG. 5 is a chart illustrating the magnetic moments of exemplary magnetic recording media before and after etching.

FIG. 5 is a chart comparing the magnetic moments of exemplary magnetic recording media that can be manufactured using the processes described above in relation to FIG. 4. These media have different capping layers in terms of the level of metal doping. Medium M1 has a capping layer without any metal doping for comparison. Media M2, M3, M4, and M5 each have a capping layer doped with a small amount of Ru. Further, medium M1 can contain an amount of Co equal to, or higher than, that of media M2, M3, and M4. FIG. 5 shows the respective capping layer magnetic moment (Ms) of the media before and after etching. For each magnetic recording medium, the left column 502 represents the Ms before etching the capping layer, and the right column 504 represents the Ms after etching the capping layer. In one example, the etching amount of the media M1, M2, M3, M4, and M5 are 10.1 Å, 9.3 Å, 10.2 Å, 10.8 Å, and 10.3 Å, respectively. As shown in FIG. 5, medium M1 has a Ms less than 600 emu/cc, and media M2, M3, and M4 each have Ms equal to or greater than 600 emu/cc before or after etching. For each sample media, FIG. 5 shows that the magnetic moment (Ms) of the media is increased by etching.

Figure 6:
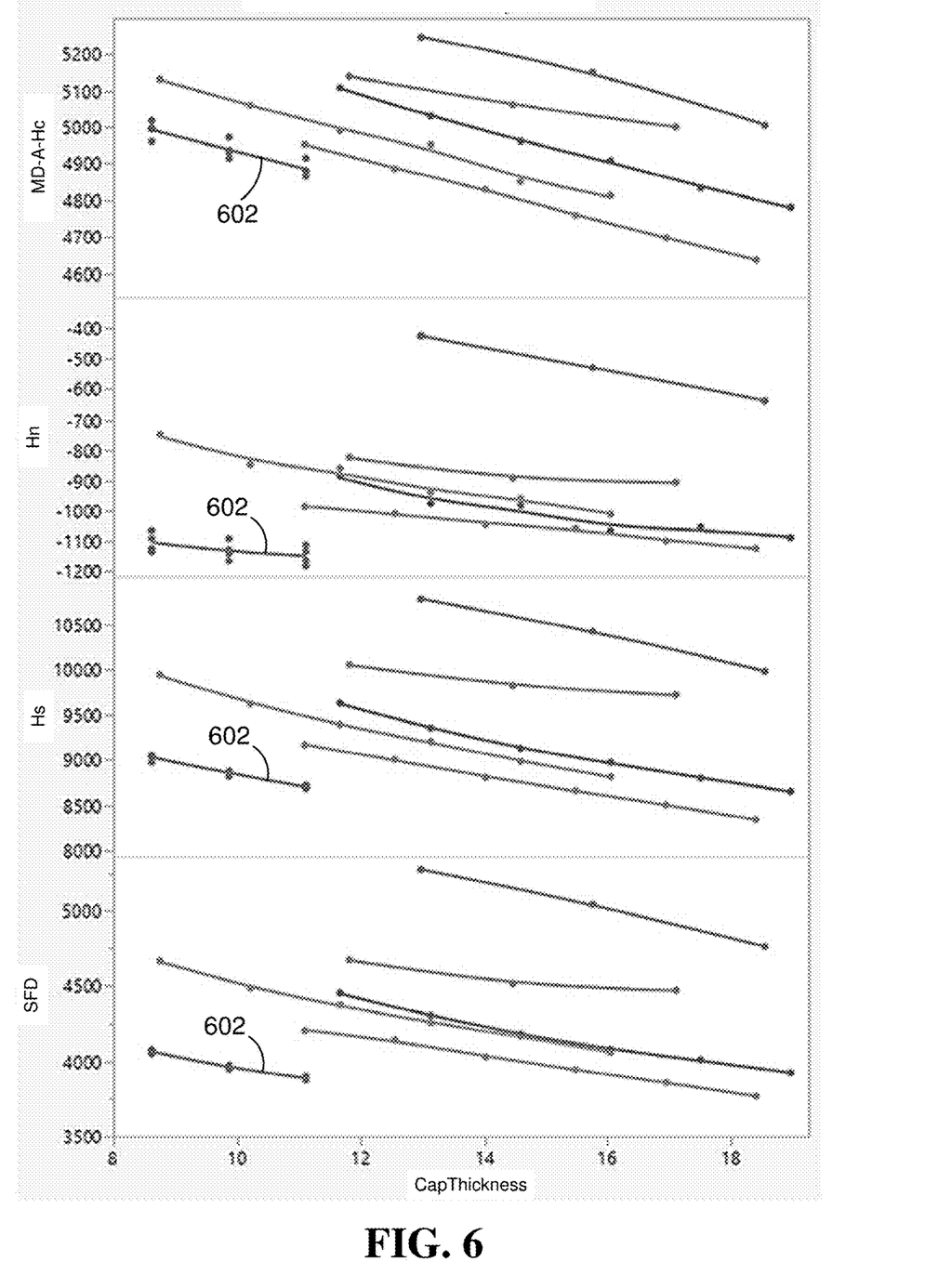
FIG. 6 is a chart illustrating the effect of a metal-doped capping layer in controlling grain-to-grain exchange coupling in a capping layer of exemplary magnetic recording media.

FIG. 6 illustrates the effect of a metal-doped capping layer in controlling grain-to-grain exchange coupling in capping layers of six exemplary magnetic recording media. Some of the exemplary media are the same as those described above in relation to FIG. 5. As discussed above, the grain-to-grain exchange coupling of a capping layer can be controlled by doping an effective amount of metal (e.g., Ru) in the capping layer such that the magnetic moment of a capping layer can be increased (e.g., by etching and/or modifying the content of Co/Pt) without significant grain-to-grain exchange coupling increase. In FIG. 6, the horizontal axis represents the capping layer thickness, and the vertical axis separately represents magnetic coercivity (Hc), nucleation field (Hn), saturation field (Hs), and switching field distribution (SFD). The grain-to-grain exchange coupling of a capping layer of media can be characterized using Hc, Hs, Hn, and SFD, where higher values of Hc, Hs, Hn, and SFD generally correspond to lower grain-to-grain exchange coupling. As shown in FIG. 6, values of Hc, Hs, Hn, and SFD of a medium without a metal-doped capping layer 602 are generally lower than those of other magnetic recording media using a metal-doped capping layer as described above in relation to FIGS. 3-4. Correspondingly, the grain-to-grain exchange coupling characteristics of the medium without the metal-doped capping layer are generally higher than those of other magnetic recording media using the metal-doped capping layer as described above in relation to FIGS. 3-4. Therefore, it can be appreciated that the addition of an effective amount of metal (e.g., Ru or Ta) in the capping layer can prevent or reduce an increase of the grain-to-grain exchange coupling of a capping layer even when it has a higher Ms (e.g., an increase of Co content after etching).

Figure 7:
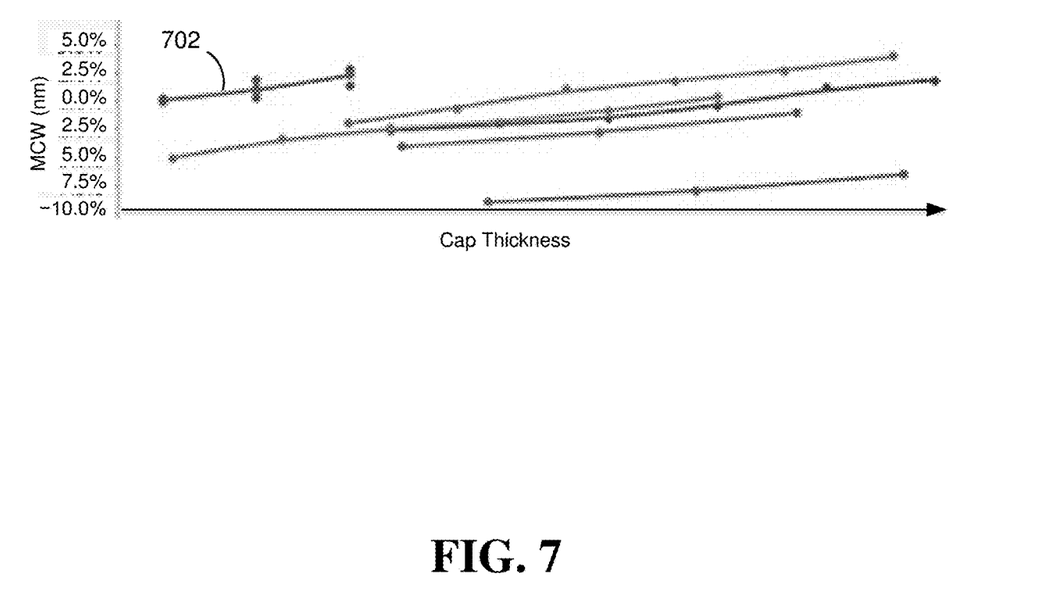
FIG. 7 is a chart illustrating the effect of a metal-doped capping layer in controlling the magnetic core width (MCW) of exemplary magnetic recording media.

FIG. 7 illustrates the effect of a metal-doped capping layer in controlling the magnetic core width (MCW) of exemplary magnetic recording media. In FIG. 7, the horizontal axis represents the capping layer thickness, and the vertical axis represents the MCW of the media. Reducing the MCW of magnetic recording media can reduce the track width of the media and increase the areal density of the media. As shown in FIG. 7, the MCW 702 of a magnetic recording medium without a metal-doped (e.g., Ru or Ta) capping layer is higher than the other magnetic recording media using a metal-doped (e.g., Ru) capping layer as described above in relation to FIGS. 3-4.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium comprising:
   a substrate;
   a magnetic recording layer (MRL) on the substrate; and
   an etched capping layer comprising CoCrPtBRu directly on the MRL,
   wherein a thickness of the etched capping layer is in a range from 11 Å to 15 Å, inclusive,
   wherein the etched capping layer comprises Cr at 4.5 to 6.5 atomic percent and is doped with Ru in a range from 1 atomic percent to 5 atomic percent, inclusive,
   wherein the etched capping layer comprises a magnetic layer that is furthest from the substrate among all magnetic layers in the magnetic recording medium, and
   wherein a surface roughness of the etched capping layer is less than 4 Angstrom (Å).

2. The magnetic recording medium of claim 1, wherein the surface roughness of the etched capping layer is less than 3.5 Å.

3. The magnetic recording medium of claim 1, wherein the Ru of the etched capping layer is configured to reduce a lateral exchange coupling of the etched capping layer as compared to a capping layer without Ru.

4. The magnetic recording medium of claim 1, wherein the Co of the etched capping layer is at 60 atomic percent or greater.

5. The magnetic recording medium of claim 4, wherein the Ru of the etched capping layer is in a range of 2 atomic percent to 4 atomic percent, inclusive.

6. The magnetic recording medium of claim 5, wherein the Ru of the etched capping layer is about 3 atomic percent.

7. The magnetic recording medium of claim 1, wherein a magnetic moment of the magnetic recording medium is in a range of 500 emu/cc to 800 emu/cc, inclusive.

8. A data storage device, comprising:
a slider comprising a magnetic head; and
the magnetic recording medium of claim 1,
wherein the slider is configured to write information to the magnetic recording layer of the magnetic recording medium.

9. The magnetic recording medium of claim 1, further comprising:
an overcoat directly on the etched capping layer.

10. The magnetic recording medium of claim 1, wherein the etched capping layer comprises Cr at 4.5, 5.5, 6, or 6.5 atomic percent.

11. The magnetic recording medium of claim 1, wherein the etched capping layer is doped with about 3 atomic percent of Ru.

* * * * *